US012742966B2

(12) United States Patent
Husson et al.

(10) Patent No.: US 12,742,966 B2
(45) Date of Patent: Sep. 22, 2026

(54) HEAD-UP DISPLAY

(71) Applicant: VALEO COMFORT AND DRIVING ASSISTANCE, Créteil (FR)

(72) Inventors: Arnaud Husson, Creteil (FR); Pierre Mermillod, Creteil (FR)

(73) Assignee: VALEO COMFORT AND DRIVING ASSISTANCE, Créteil (FR)

(*) Notice: Subject to any disclaimer, the term of this patent is extended or adjusted under 35 U.S.C. 154(b) by 364 days.

(21) Appl. No.: 18/565,514

(22) PCT Filed: May 25, 2022

(86) PCT No.: PCT/EP2022/064206
§ 371 (c)(1),
(2) Date: Nov. 30, 2023

(87) PCT Pub. No.: WO2022/253666
PCT Pub. Date: Dec. 8, 2022

(65) Prior Publication Data
US 2024/0264436 A1 Aug. 8, 2024

(30) Foreign Application Priority Data
May 31, 2021 (FR) .................................. FR2105704

(51) Int. Cl.

| | |
|---|---|
| ***G02B 27/01*** | (2006.01) |
| *B60K 35/23* | (2024.01) |
| *B60K 35/81* | (2024.01) |

(52) U.S. Cl.
CPC ..... *G02B 27/0101* (2013.01); *G02B 27/0149* (2013.01); *B60K 35/23* (2024.01);
(Continued)

(58) Field of Classification Search
CPC ............ G02B 27/0101; G02B 27/0149; G02B 27/0179; G02B 2027/0138;
(Continued)

(56) References Cited

U.S. PATENT DOCUMENTS

| | | | |
|---|---|---|---|
| 10,018,841 | B1 | 7/2018 | Chen |
| 2006/0071877 | A1 | 4/2006 | Kanamori et al. |

(Continued)

FOREIGN PATENT DOCUMENTS

| | | | |
|---|---|---|---|
| CN | 108663807 | A | 10/2018 |
| CN | 109471261 | A | 3/2019 |

(Continued)

OTHER PUBLICATIONS

International Search Report issued in corresponding International Application No. PCT/EP2022/064206 mailed Sep. 22, 2022 (5 pages).
Written Opinion issued in corresponding International Application No. PCT/EP2022/064206 mailed Sep. 22, 2022 (5 pages).
Office Action issued by the CNIPA for corresponding Chinese Patent Application No. 202280038615.6, mailed May 21, 2026 (16 pages).

*Primary Examiner* — James C. Jones
(74) *Attorney, Agent, or Firm* — Osha Bergman Watanabe & Burton LLP

(57) ABSTRACT

A head-up display for a motor vehicle comprises, inside a casing, an image-generating system from which emerge two source light beams, and two projecting optical systems that each project one source light beam toward the exterior so as to form two virtual images in the field of view of a vehicle driver: the head-up display further comprises an occulting part that allows a crossed imaging effect to be eliminated, and that may be motorized and the position of which may be automatically controlled depending on the position of the eyes of the driver of the vehicle.

11 Claims, 3 Drawing Sheets

(52) U.S. Cl.
CPC .......... *B60K 35/81* (2024.01); *B60K 2360/23* (2024.01); *G02B 2027/0138* (2013.01); *G02B 2027/014* (2013.01); *G02B 2027/0154* (2013.01); *G02B 27/0179* (2013.01); *G02B 2027/0187* (2013.01)

(58) Field of Classification Search
CPC ...... G02B 2027/014; G02B 2027/0154; G02B 2027/0187; G02B 27/0018; G02B 27/0093; G02B 2027/0185; G02B 2027/012; B60K 35/23; B60K 35/81; B60K 2360/23
See application file for complete search history.

(56) References Cited

U.S. PATENT DOCUMENTS

| | | | | |
|---|---|---|---|---|
| 2016/0202482 | A1* | 7/2016 | Kuzuhara | H04N 5/7491 359/633 |
| 2019/0187475 | A1* | 6/2019 | Omanovic | G08G 1/166 |
| 2020/0012099 | A1 | 1/2020 | Kim et al. | |
| 2020/0167563 | A1 | 5/2020 | Chen et al. | |

FOREIGN PATENT DOCUMENTS

| | | | |
|---|---|---|---|
| CN | 213240675 | U | 5/2021 |
| JP | 2016206289 | A | 12/2016 |

* cited by examiner

[Fig. 1]
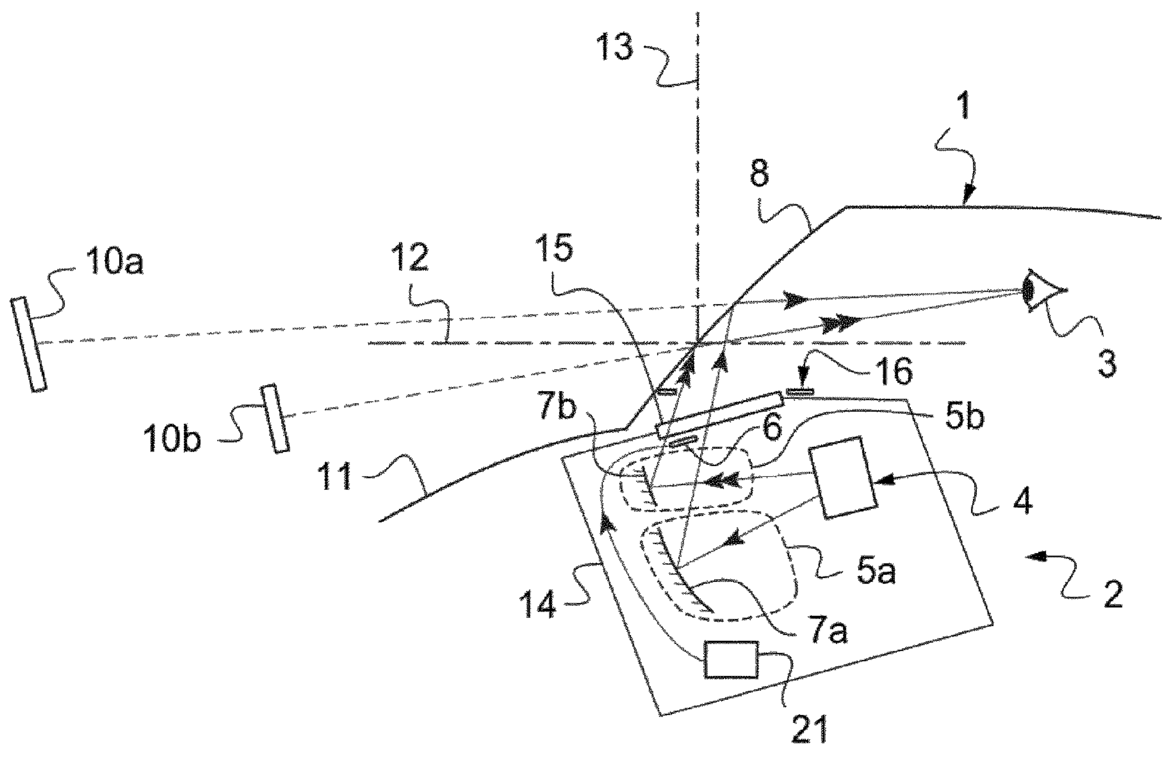
[Fig. 2]
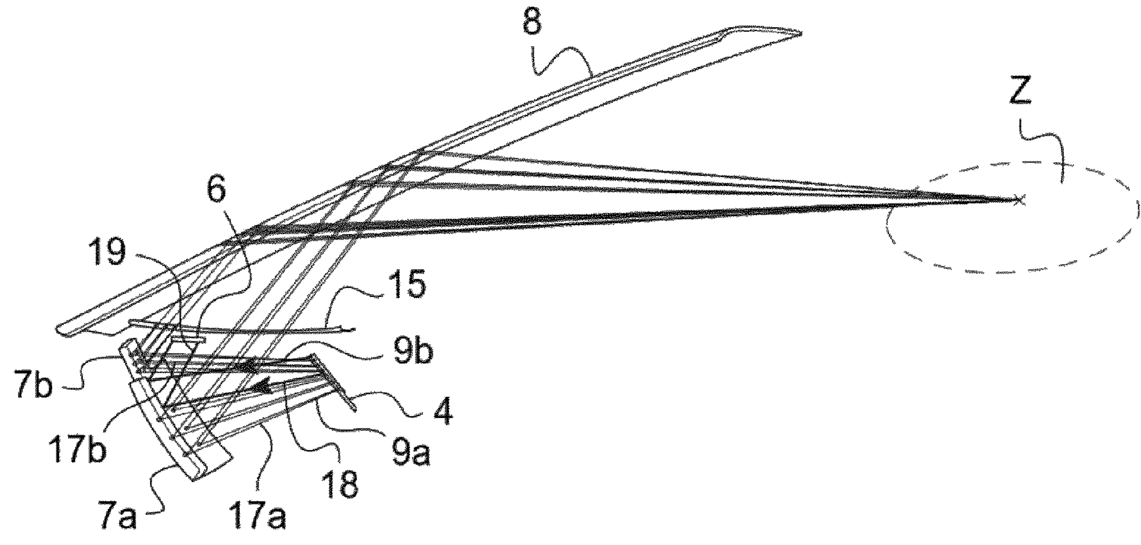

[Fig. 3]
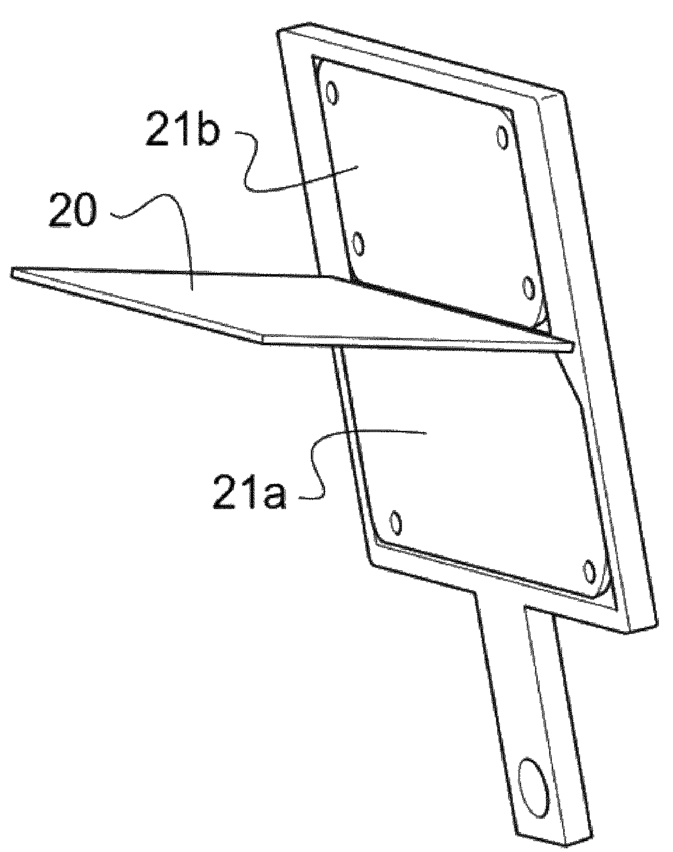
[Fig 4]
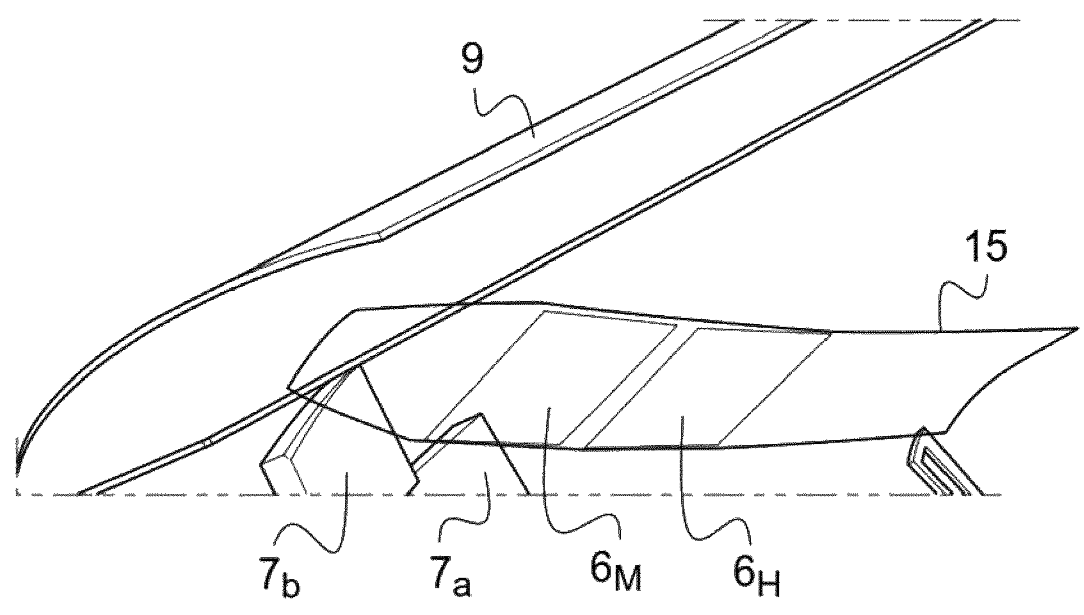

[Fig 5]
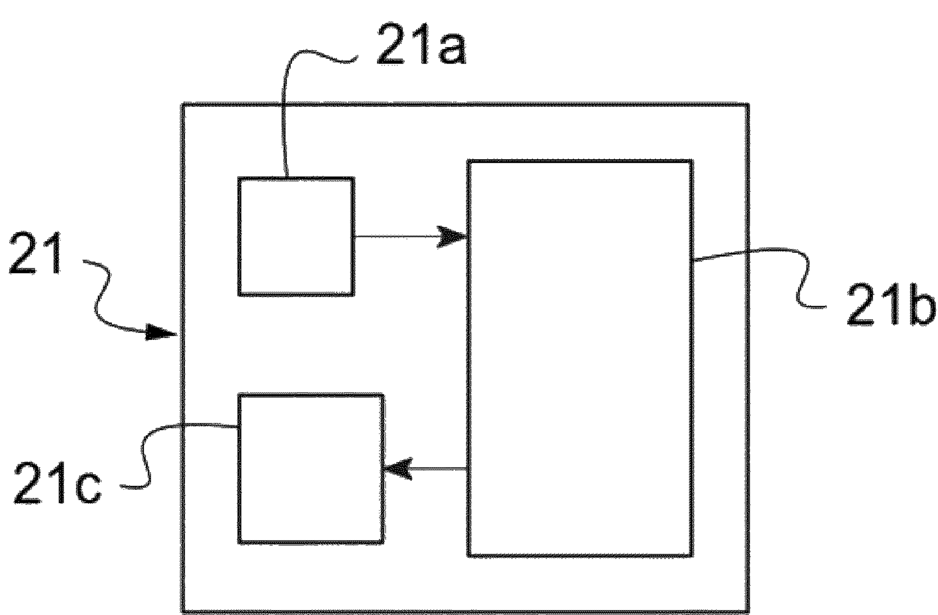

HEAD-UP DISPLAY

The present invention relates in general to the field of displays.

It relates more particularly to a head-up display for a motor vehicle.

It is particularly comfortable for the driver of a motor vehicle to be able to view information relating to the operation of the vehicle and to the road ahead of the vehicle, inter alia, without having to divert their gaze from the road ahead to do so.

For this purpose, it is known practice to equip the motor vehicle with what is known as a "head-up" display comprising, inside a housing, an image generation system from which a source light beam emerges and an optical projection system designed to project an image generated by the image generation system outwardly, via the windshield for example, so as to form a virtual image in the field of view of a driver of said motor vehicle.

The virtual image, which contains the information to be displayed, is then visually superposed on the environment ahead of the vehicle.

Head-up displays that make it possible to project a double virtual image onto the driver's windshield are also known. In this scenario, the double virtual image may be formed at different projection distances from one or more source light beams combined with multiple optical projection systems.

However, in this case, if multiple imaging channels, each consisting of the association of a source light beam with an optical projection system, are thus created independently, each producing a virtual image, respectively, crosstalk phenomena may occur. These phenomena result from the passage of a portion of one or more source light beams through an optical projection system that is not associated therewith, thus creating one or more redundant and parasitic images. These crosstalk phenomena should be avoided.

In order to overcome this problem, the present invention proposes a head-up display comprising, inside a housing:

- an image generation system;
- a first optical projection system comprising a first mirror and a second optical projection system comprising a second mirror;
- the housing comprising an opening that is closed off by a transparent window;
- characterized in that:
- the image generation system is designed to emit a first source light beam and a second source light beam that are spatially distinct from one another;
- the first optical projection system and said second optical projection system are designed to project said first source light beam and second source light beam, respectively, outwardly through said transparent window, so as to form a first virtual image at a first projection distance and a second virtual image at a second projection distance in the field of view of a driver of said motor vehicle;
- the second optical projection system is designed to be passed through by a second intermediate light beam originating from the second source light beam;
- the first mirror is able, on the one hand, to intercept a portion of the second intermediate light beam and, on the other hand, to reflect said portion as a reflected portion;
- the head-up display comprises a masking piece interposed between the first mirror and the transparent window, and designed to stop said reflected portion.

Advantageously, the first projection distance and the second projection distance are distinct.

Preferably, the first projection distance is greater than the second projection distance.

The first projection distance is for example greater than 8 meters.

The first projection distance is for example less than 15 meters.

Preferably, the first projection distance is between 8 and 15 meters, and here between 10 and 12 meters.

The second projection distance is for example greater than 1 meter.

The second projection distance is for example less than 5 meters.

Preferably, the second projection distance is between 1 and 5 meters, and here between 2 and 3 meters.

Preferably, the first virtual image has dimensions greater than the dimensions of the second virtual image.

In one embodiment, the head-up display furthermore comprises a separating piece arranged between the first source light beam and the second source light beam.

In this embodiment, the first optical projection system is designed to be passed through by a first intermediate light beam originating from the first source light beam. The separating piece, for its part, stops at least a portion of the first intermediate light beam incident on the second mirror.

In one embodiment, the masking piece is movable.

In a first variant of said embodiment, the head-up display furthermore comprises a first control system and the masking piece is driven by a motor. The first control system may then comprise: an acquisition device, designed to determine the position of the eyes of a driver of the motor vehicle; an electronic processing unit connected to the acquisition device and designed to compute a position of the masking piece; a servo-control system designed to servo-control the displacement of the motor according to a setpoint in relation to the position computed by the electronic processing unit.

In this variant, adjusting means are configured to modify the inclination of the second mirror. The electronic processing unit is then also designed to compute an optimum inclination of the second mirror. The servo-control system is also designed to servo-control the actuation of the adjusting means according to a prior setpoint in relation to the optimum inclination computed by the electronic processing unit.

In a second variant of said embodiment, the head-up display furthermore comprises a second control system, the masking piece is driven by a motor, and the inclination of the second mirror is adjustable (manually). The second control system may comprise: an electronic processing unit designed to receive information relating to the inclination of the second mirror and to compute a position of the masking piece; a servo-control system designed to servo-control the displacement of the motor according to a setpoint in relation to the position computed by the electronic processing unit.

In a third variant of said embodiment, the inclination of the second mirror is adjustable (manually) and the position of the masking piece is adjustable (manually).

Moreover, the masking piece is preferably located at a distance less than one centimeter from the transparent window.

For example, the masking piece is located at a distance between 1 mm and 3 mm from the transparent window.

Of course, the various features, variants and embodiments of the invention may be combined with one another in various combinations provided that they are not incompatible with one another or mutually exclusive.

Moreover, various other features of the invention will become apparent from the appended description given with reference to the drawings, which illustrate non-limiting embodiments of the invention and in which:

FIG. 1 is a schematic view showing the integration of a head-up display according to the invention into a motor vehicle.

FIG. 2 is a detailed view of one embodiment of the head-up display of FIG. 1, showing part of the path of the light rays originating from the image generation system through the head-up display.

FIG. 3 is a magnified view of a separating piece.

FIG. 4 is a magnified view of a masking piece in two different positions.

FIG. 5 is a schematic depiction of one embodiment of the system for controlling the displacement of the masking piece.

It should be noted that, in these figures, structural and/or functional elements common to the various variants may have the same references.

FIG. 1 schematically shows, from the side, a motor vehicle 1 equipped with a head-up display 2 according to the invention. An individual, here the driver 3, is located in the passenger compartment of the vehicle.

The display 2 comprises, first of all, a housing 14 that is generally positioned under a dashboard 16 of the vehicle 1 and that has, here in its upper part close to the dashboard 16, an opening that is closed off by a transparent window 15 designed to let through the various light beams useful for the operation of the display, as explained hereinafter.

As shown in FIG. 1, the head-up display 2 comprises, inside this housing 14, an image generation system 4 generating two spatially distinct images, a first optical projection system 5*a* and a second optical projection system 5*b*, a masking piece 6 and a control system 21 for controlling the displacement of the masking piece.

The image generation system 4 may consist of a single image generation unit or of two image generation units.

The one or more image generation units may be for example a liquid-crystal screen backlit by a light source. They may also be a diffusion screen backlit by a light source, equipped with a scanning system at the rear. They may also be an optical diffuser backlit by a beam. For example, the beam may come from a liquid crystal on silicon (LCoS) screen. In this case, one particular configuration is a holographic system, in which the beam coming from the LCoS screen undergoes a Fourier transform before reaching the optical diffuser. The LCoS screen may be backlit by a laser diode, for example.

The image generation system 4 emits a first source light beam 9*a* and a second source light beam 9*b*. The first source light beam 9*a* and the second source light beam 9*b* are spatially distinct. However, they may exhibit areas of overlap.

If the image generation system 4 consists of two separate image generation units, these may be positioned one below the other, in a vertical direction (see FIG. 1). The horizontal direction 12 may be defined as being the direction that is substantially parallel to the road on which the vehicle is traveling. In other words, it could be said that the horizontal direction is the direction of the instantaneous speed of the vehicle moving on the road. The vertical direction 13 may then be defined as being perpendicular to the horizontal direction.

The images generated by the image generation system are generated on the basis of a control signal coming from the on-board computer (not shown) of the vehicle 1.

The first optical projection system 5*a* and the second optical projection system 5*b* respectively project the first source light beam 9*a* and the second source light beam 9*b* outwardly via the transparent window 15 of the housing 14 so as to form, respectively, a first virtual image 10*a* at a first projection distance and a second virtual image 10*b* at a second projection distance.

For example, the first virtual image 10*a* is located above the second virtual image 10*b* in the vertical direction 13.

For example, the first virtual image 10*a* has dimensions greater than those of the second virtual image 10*b*.

First intermediate light beam 17*a* will be the name given to the light beam originating from the first source light beam 9*a* and passing through the first optical projection system 5*a*, and then passing through the transparent window 15. In the same way, second intermediate light beam 17*b* will be the name given to the light beam originating from the second source light beam 9*b* and passing through the second optical projection system 5*b*, and then passing through the transparent window 15.

The first intermediate light beam 17*a* and the second intermediate light beam 17*b* are projected toward a partially transparent plate 8. The partially transparent plate 8 reflects the first intermediate light beam 17*a* and the second intermediate light beam 17*b* in the direction of the driver 3. Said driver then sees the virtual image projected by the first source light beam 9*a* and the virtual image projected by the second source light beam 9*b*, and formed by reflection from the partially transparent plate 8. The path of the light rays forming the first intermediate light beam 17*a* and the second intermediate light beam 17*b* is illustrated in FIG. 2.

Here, the partially transparent plate 8 is the windshield of the vehicle 1. As a variant, however, the partially transparent plate 8 could be a dedicated combiner, for example located between the windshield of the vehicle and the transparent window 15 of the housing of the head-up display 2.

In the embodiment shown in FIG. 2, the first optical projection system 5*a* comprises a first mirror 7*a* and the second optical projection system 5*b* comprises a second mirror 7*b*.

The first mirror 7*a* reflects the first intermediate light beam 17*a*. This first mirror 7*a* is convergent, so as, after reflection by the windshield 8, to form the first virtual image 10*a* at a given distance in front of the display 2 (at a given distance from the windshield 8, on the side of the windshield 8 opposite the driver 3), in front of the hood 11 of the vehicle 1. This distance may for example be between 8 meters and 15 meters, and here between 10 meters and 12 meters.

In the same way, the second mirror 7*b* reflects the second intermediate light beam 17*b*. This second mirror 7*b* is convergent, so as, after reflection by the windshield 8, to form the second virtual image 10*b* at a given distance in front of the display 2 (at a given distance from the windshield 8, on the side of the windshield 8 opposite the driver 3), in front of the hood 11 of the vehicle 1. This distance may for example be between 1 meter and 5 meters, and here between 2 meters and 3 meters.

The first mirror 7*a* may for example be located below the second mirror 7*b* in the vertical direction 13 defined above, such that the first virtual image 10*a* is visible above the second virtual image 10*b*.

Advantageously, the first mirror 7*a* and the second mirror 7*b* are curved, for example optimized so as to respectively increase the magnification of the first optical projection system 5*a* and that of the second optical projection system 5*b* and/or to compensate for the optical distortions or aberrations that could be caused by the reflection on the windshield 8. For example, the first mirror 7*a* and the second mirror 7*b* may be aspheric, or of polynomial shape.

As a variant, the first optical projection system 5*a* and the second optical projection system 5*b* could each comprise one or more plane mirrors arranged on the path of the first intermediate light beam 17*a* and of the second intermediate light beam 17*b*. These mirrors would make it possible to fold the path taken by the first intermediate light beam 17*a* and second intermediate light beam 17*b*, respectively, between the image generation system 4 and the windshield 8. The distance separating the image generation system 4 and the windshield 8 along this path is thereby increased, which would make it possible to adjust the first projection distance and the second projection distance while still maintaining a reduced volume for the display 2.

As illustrated in FIG. 2, the first mirror 7*a* intercepts a portion 18 of the second intermediate light beam 17*b* and reflects it as a reflected portion 19. This reflected portion 19 could create a redundant virtual image originating from the second source light beam 9*b* and able to interfere with the field of view of the driver 3. This is the crosstalk phenomenon mentioned previously.

As indicated above, the display 2 furthermore comprises a masking piece 6. As illustrated in FIG. 2, the masking piece 6 is interposed between the first mirror 7*a* and the transparent window 15 of the housing 14, so as to mask the reflected portion 19. The formation of a redundant virtual image originating from the second source light beam 9*b* is thereby avoided. The masking piece 6 may for example be located under the transparent window 15 of the housing 14, at a distance from the transparent window 15 less than 1 cm, for example between 1 mm and 3 mm.

The masking piece 6 is for example rectangular; as a variant, it may possibly be modified so as to avoid phenomena of vignetting of the first virtual image 10*a* and the second virtual image 10*b*.

Advantageously, the masking piece 6 is an optical absorber, such as a matte black plate. This makes it possible to limit any parasitic light in the field of view of the driver 3.

Advantageously, in order to eliminate any parasitic image originating from the first source light beam 9*a* or from the second source light beam 9*b* (here from the first source light beam 9*a*) in the field of view of the driver 3, which also corresponds to a crosstalk phenomenon, a separating piece 20 may be arranged between the first source light beam 9*a* and the second source light beam 9*b*.

More precisely, and in the example described here, the separating piece 20 masks the first source light beam 9*a* and the second source light beam 9*b* from one another. The separating piece 20 stops at least a portion of the rays originating from the first source light beam 9*a* that would be at risk of reaching the second optical projection system 5*b*. This stopped portion therefore does not pass through the second optical projection system 5*b* and is therefore not projected through it, not passing a fortiori through the transparent window 15 or being reflected by the windshield 8.

Thus, by virtue of the separating piece 20, a virtual image projected by the first source optical beam 9*a* through the second optical projection system 5*b* is therefore at least partially eliminated. In other words, its spatial extent in the field of view of the driver 3 is reduced.

The separating piece 20 may be finished so as to limit any phenomenon of vignetting of the first virtual image 10*a* or of the second virtual image 10*b*, for example by chamfering. Such a separating piece 20 is shown in FIG. 3, in the case where the image generation system comprises a first optical diffuser 21*a* diffusing the first source light beam 9*a* and a second optical diffuser 21*b* diffusing the second source light beam 9*b*. The coupling of the masking piece 6 and of the separating piece 20 makes it possible to completely eliminate crosstalk phenomena in the head-up display 2 according to the invention.

It should be noted that the orientation and the shape of the first intermediate light beam 17*a* and of the second intermediate light beam 17*b*, which create the virtual image 10*a*, the virtual image 10*b* and the possible redundant image originating from the second source light beam 9*b*, vary depending on the position of the driver's eyes in all locations where the driver's eyes may be located in a driving situation. All of these locations will be called the eye box Z.

In a driving situation, the eye box Z may be modeled by a three-dimensional ellipsoid, in order to take into account front-to-rear eye movements along the horizontal direction, top-to-bottom eye movements along the vertical direction, and left-to-right eye movements in a plane perpendicular to the plane formed by the horizontal direction 12 and vertical direction 13.

In practice, it is considered that the eye box Z is a parallelepiped. For example, the vertical and horizontal dimensions of the eye box Z may be 120 mm by 120 mm.

In order to make it possible for the masking piece 6 to eliminate the redundant image originating from the second source light beam 9*b* for drivers of different sizes, it is proposed here to adapt the position of the masking piece 6 to the position of the eyes of the driver 3 within the eye box Z.

Thus, advantageously, the masking piece 6 is movable, for example by being driven by a motor (not shown) allowing it to be displaced. This displacement may typically be carried out from front to rear (in the horizontal direction 12 defined above) and vice versa, over a range for example of the order of 50 to 60 mm. The position of the masking piece 6 may in this case be controlled by a first control system 21 that is illustrated schematically in [FIG. 5].

The first control system comprises an acquisition device 21*a*, an electronic processing unit 21*b* connected to the acquisition device 21*a*, and a servo-control system 21*c* for controlling the displacement of the motor on the basis of a setpoint computed by the processing unit 21*b*. The acquisition device 21*a* is a camera, for example.

The camera 21*a* records the position of the eyes of the driver 3 in real time. The signal recorded by the camera 21*a* is received (here continuously) by the electronic processing unit 21*b* of the first control system 21.

Said electronic processing unit computes the position of the masking piece 6 corresponding to the optimum masking of the reflected portion 19 reflected by the first mirror 7*a*, based on the orientation and the shape of the first intermediate light beam 17*a* and of the second intermediate light beam 17*b* that are reflected, via the windshield 8, toward the eyes of the driver 3 in the position recorded by the camera 21*a*. The computations may be carried out beforehand for a set of positions of the eyes of the driver 3, for a determined position of the second mirror 7*b*, and the position of the masking piece for a position of the eyes is then stored in a correspondence table (for example stored in the electronic processing unit 21*b*).

The electronic processing unit 21*b* then generates a setpoint that is sent to the servo-control system 21*c* for servo-controlling the motor. The servo-control system 21*c* then triggers the displacement of the motor so as to position the masking piece 6 at the position computed by the electronic processing unit 21*b*.

The redundant virtual image originating from the second source light beam 9*b* is thus absent (here continuously) from the field of view of the driver 3, by virtue of the use of such an eye-tracking system.

FIG. 4 shows the masking piece 6 in two different positions 6M and 6H, for positions of the eyes in the middle and at the top of the eye box Z, respectively.

Advantageously, the second mirror 7*b* of the second optical projection system 5*b* is able to be inclined, for example by actuating adjusting means. The adjusting means are for example a motorized system driving the second mirror 7*b* in rotation. The servo-control system 21*c* then also makes it possible to control the actuation of the motorized system driving the second mirror 7*b* in order to adjust the inclination thereof.

In this case, following the reception of the signal recorded by the camera 21*a* in relation to the position of the eyes of the driver 3, the electronic processing unit 21*b* computes an optimum inclination of the second mirror 7*b* that makes it possible to optimize the position of the second virtual image 10*b* on the basis of the recorded position of the eyes.

The electronic processing unit 21*b* then generates, prior to triggering the displacement of the motor driving the movable piece 6, a preliminary setpoint that is sent to the servo-control system 21*c*. The servo-control system 21*c* then triggers the change of inclination of the second mirror 7*b* via the actuation of the motorized system driving the second mirror 7*b*.

The electronic processing unit 21*b* then computes, for the computed optimum inclination, the optimum position of the movable piece 6. This computation is carried out based on the orientation and the shape of the first intermediate light beam 17*a* and of the second intermediate light beam 17*b*, which are reflected, via the windshield 8, toward the eyes of the driver 3 in the position recorded by the camera 21*a*. These orientations and shapes are related to the computed optimum inclination of the second mirror 7*b*.

The processing unit 21*b* then generates a setpoint that is sent to the servo-control system 21*c* in order to displace the motor driving the masking piece 6, as described above. The servo-control system 21*c* then triggers the displacement of the motor driving the masking piece 6.

The computations may also be carried out beforehand for a set of inclinations of the second mirror 7*b*. The position of the masking piece 6 is then stored in a correspondence table (for example in the electronic processing unit 21*b*).

In a first variant not using an eye-tracking system, the position of the masking piece 6 may be controlled by a second control system 22 (not shown) different from the first control system 21. In this case, the masking piece 6 is still driven by a motor enabling displacement thereof. The second mirror 7*b* of the second optical projection system 5*b* is for example able to be inclined manually by the driver 3, thereby allowing said driver to optimize the position of the second virtual image 10*b* on the basis of the position of their eyes.

The second control system 22 comprises an electronic processing unit 22*b* that receives information relating to the inclination of the second mirror 7*b* and a servo-control system 22*c* for controlling the displacement of the motor on the basis of a setpoint computed by the electronic processing unit 22*b*.

The electronic processing unit 22*b* computes the position of the masking piece 6 that corresponds to the optimum masking of the reflected portion 19 reflected by the first mirror 7*a*, based on the information relating to the inclination of the second mirror 7*b* and the orientation and shape of the first intermediate light beam 17*a* and of the second intermediate light beam 17*b* that result therefrom. In this case too, the computations may be carried out beforehand for a set of inclinations of the second mirror 7*b*, and the position of the masking piece for an inclination of the second mirror 7*b* is then stored in a correspondence table (for example in the electronic processing unit 22*b*).

In the same way as with the eye-tracking system, the electronic processing unit 22*b* then generates a setpoint that is sent to the servo-control system 22*c* for servo-controlling the motor. The servo-control system 22*c* then triggers the displacement of the motor so as to position the masking piece 6 at the position computed by the electronic processing unit 22*b*.

In a second variant not using an eye-tracking system or a control system, a completely manual solution may be envisaged. The masking piece 6 is still movable from front to rear (in the horizontal direction 12), for example by way of a sliding system. The second mirror 7*b* of the second optical projection system 5*b* is for example able to be inclined manually by the driver 3, in order to optimize the position of the second virtual image 10*b* on the basis of the position of their eyes. The driver 3 then displaces the masking piece 6 manually in order to maximize the elimination of the redundant virtual image originating from the second source light beam 9*b*.

The invention claimed is:

1. A head-up display for a motor vehicle comprising, inside a housing:

an image generation system, a first optical projection system comprising a first mirror, and a second optical projection system comprising a second mirror, wherein the housing comprises an opening that is closed off by a transparent window, wherein the image generation system is designed to emit a first source light beam and a second source light beam that are spatially distinct from one another, wherein the first optical projection system and the second optical projection system are designed to project the first source light beam and second source light beam, respectively, outwardly through the transparent window, so as to form a first virtual image at a first projection distance and a second virtual image at a second projection distance in the field of view of a driver of the motor vehicle, wherein the second optical projection system is configured to be passed through by a second intermediate light beam originating from the second source light beam, wherein the first mirror is able to intercept a portion of the second intermediate light beam and able to reflect the portion of the second intermediate light beam as a reflected portion, wherein the head-up display comprises a masking piece interposed between the first mirror and the transparent window, and wherein the masking piece is designed to stop the reflected portion.

2. The head-up display as claimed in claim 1, wherein the first projection distance and the second projection distance are distinct.

3. The head-up display as claimed in claim 2,
wherein the first virtual image comprises dimensions greater than the dimensions of the second virtual image, and
wherein the first projection distance is greater than the second projection distance.

4. The head-up display as claimed in claim 1,
further comprising a separating piece arranged between the first source light beam and the second source light beam.

5. The head-up display as claimed in claim 4,
wherein the first optical projection system is designed to be passed through by a first intermediate light beam originating from the first source light beam, and
wherein the separating piece stops at least a portion of the first intermediate light beam that is oriented in the direction of the second mirror.

6. The head-up display as claimed in claim 1, wherein the masking piece is movable.

7. The head-up display as claimed in claim 6,
further comprising a first control system,
wherein the masking piece is driven by a motor,
wherein the first control system comprises:
an acquisition device designed to determine the position of the eyes of a driver of the motor vehicle,
an electronic processing unit connected to the acquisition device and designed to compute a position of the masking piece, and
a servo-control system designed to servo-control the displacement of the motor according to a setpoint in relation to the position computed by the electronic processing unit.

8. The head-up display as claimed in claim 7,
wherein adjusting means are configured to modify the inclination of the second mirror,
wherein the electronic processing unit is further designed to compute an optimum inclination of the second mirror, and
wherein the servo-control system is further designed to servo-control the actuation of the adjusting means according to a prior setpoint in relation to the optimum inclination that is computed by the electronic processing unit.

9. The head-up display as claimed in claim 6,
further comprising a second control system,
wherein the masking piece is driven by a motor,
wherein the inclination of the second mirror is manually adjustable, and
wherein the second control system comprises:
an electronic processing unit designed to receive information relating to the inclination of the second mirror and to compute a position of the masking piece, and
a servo-control system designed to servo-control the displacement of the motor according to a setpoint in relation to the position that is computed by the electronic processing unit.

10. The head-up display as claimed in claim 6,
wherein the inclination of the second mirror is manually adjustable, and
wherein the position of the masking piece is manually adjustable.

11. The head-up display as claimed in claim 1,
wherein the masking piece is located less than one centimeter from the transparent window.

* * * * *